(12) United States Patent
Kaul (10) Patent No.: US 11,245,569 B2
(45) Date of Patent: Feb. 8, 2022

(54) SYSTEM AND METHOD FOR ENHANCING IDENTIFICATION OF NETWORK NODE INITIATOR ERRORS

(71) Applicant: T-Mobile USA, Inc., Bellevue, WA (US)

(72) Inventor: Mayank Kaul, Renton, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 16/577,551

(22) Filed: Sep. 20, 2019

(65) Prior Publication Data
US 2021/0092005 A1    Mar. 25, 2021

(51) Int. Cl.
*H04L 12/24* (2006.01)
*H04L 29/06* (2006.01)
*H04W 24/04* (2009.01)
*H04L 12/26* (2006.01)
*H04L 12/741* (2013.01)

(52) U.S. Cl.
CPC ...... *H04L 41/0686* (2013.01); *H04L 41/0677* (2013.01); *H04L 43/0847* (2013.01); *H04L 45/745* (2013.01); *H04L 69/22* (2013.01); *H04W 24/04* (2013.01)

(58) Field of Classification Search
CPC combination set(s) only.
See application file for complete search history.

(56) References Cited

U.S. PATENT DOCUMENTS

| | | | |
|---|---|---|---|
| 6,253,349 B1* | 6/2001 | Maeda | G06F 11/10 714/799 |
| 8,041,335 B2* | 10/2011 | Khetawat | H04W 76/12 455/404.2 |
| 10,609,740 B2* | 3/2020 | Stojanovski | H04W 76/12 |
| 2004/0196785 A1* | 10/2004 | Janakiraman | H04L 47/10 370/229 |
| 2005/0022089 A1* | 1/2005 | Le | H04L 1/1867 714/749 |
| 2009/0310610 A1* | 12/2009 | Sandstrom | H04L 47/125 370/392 |
| 2010/0167706 A1* | 7/2010 | Ohtsu | H04W 4/16 455/414.1 |
| 2011/0013511 A1* | 1/2011 | Li | H04L 47/11 370/231 |
| 2012/0096159 A1* | 4/2012 | Short | H04L 63/0892 709/225 |
| 2015/0098325 A1* | 4/2015 | Lu | H04M 15/8027 370/230 |
| 2019/0215804 A1* | 7/2019 | Wan | H04W 72/04 |

\* cited by examiner

*Primary Examiner* — Xavier S Wong
(74) *Attorney, Agent, or Firm* — Loeb & Loeb LLP (57) ABSTRACT

A method and system for adding a notification to an error message. A first node and a second node are positioned in a communication network, and the first node is different from the second node. The first node is configured to process a network message before sending the network message to the second node. The first node encounters an error when processing the network message, and, before sending the network message to the second node, writes a reason of the error in a header section of the network message. The first node is configured to send the network message to the second node with the header section.

19 Claims, 6 Drawing Sheets

SYSTEM AND METHOD FOR ENHANCING IDENTIFICATION OF NETWORK NODE INITIATOR ERRORS

TECHNICAL FIELD

Embodiments discussed herein generally relate to identifying errors in message processing from network nodes.

BACKGROUND

Figure 1:
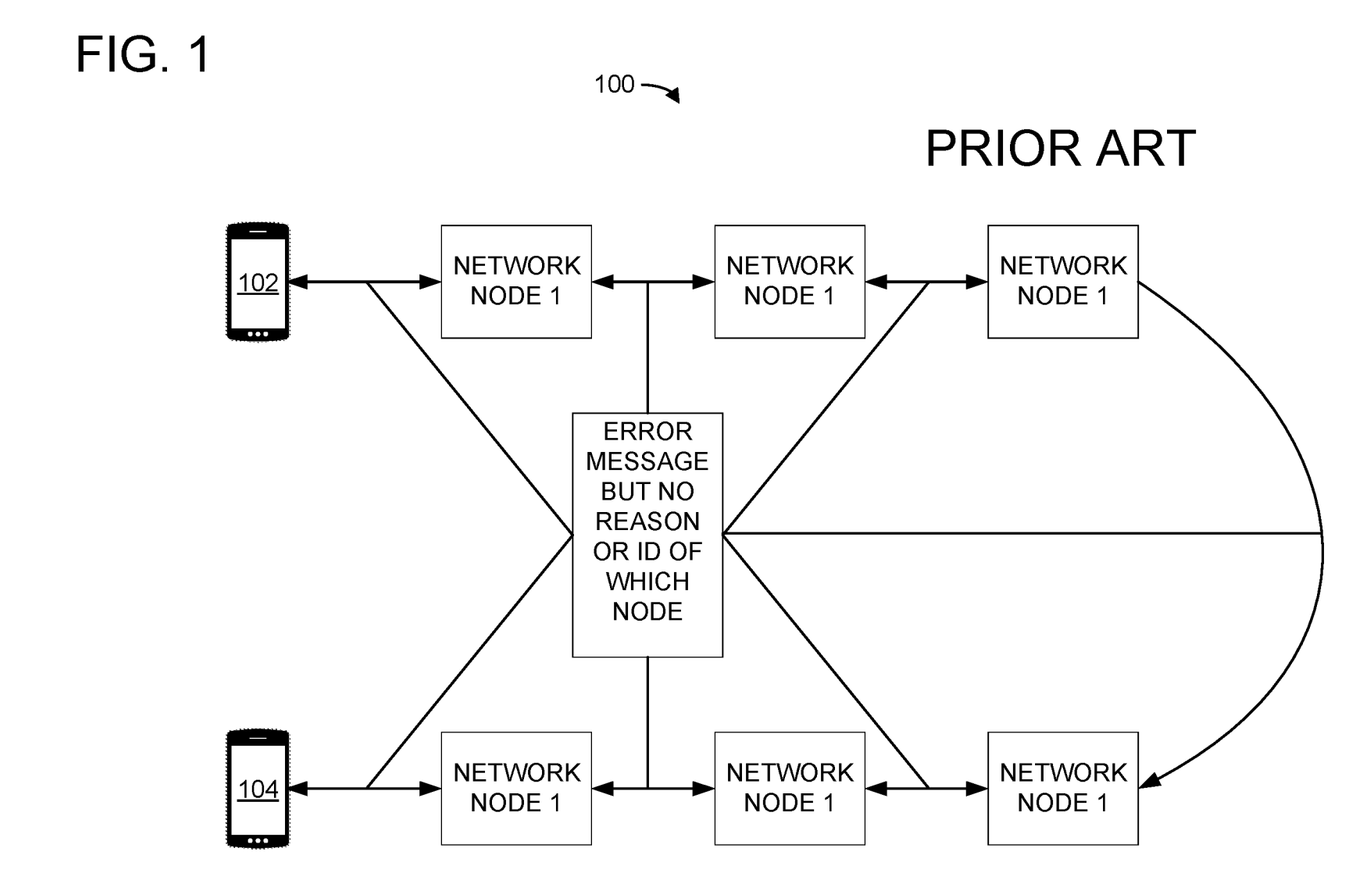
FIG. 1 is a diagram illustrating an exemplary prior art practice of software development.

Calls, messages, etc., over a network traverse a multitude of nodes. At any given point of time, any one of the nodes may generate an error due to multiple reasons. For example, the errors may be due to a problem with the request, the node's own error, an unauthorized request, a provisioning error, etc. These error responses, as shown in FIG. 1, may be sent back to a user equipment (UE) 102 through multiple nodes in between. For example, if an error occurs in the middle of a voice call, the error will be sent through all the nodes to an originating UE 102 as well as a terminated UE 104 to clear up the call.

In another example, if there is a problem with originating UE's 102 request, the error response gets sent back to just the originating UE 102.

This seemingly typical process, unfortunately, causes a network management or analysis issue due to lack of clarity. For example, if a telephony application server (TAS) on the terminated side of the UE 104 sends an error message, and the error message reaches all the way to the originating proxy call session control function (P-CSCF), when a network administrator reviews counters or key performance indicators (KPIs), the network administrator is unable to discern whether it was the P-CSCF that generated the error or another entity. The only way to find out would be to look at the individual end-to-end trace to identify the source of the error, which impairs the ability to evaluate and judge network performance holistically.

Therefore, embodiments attempt to create a technical solution to address the deficiencies of the challenges above.

SUMMARY

Embodiments create a technical solution to the above challenges by adding a new header field or section indicating a reason for the error message and an identification of the node that generates or initiates the error. In a further embodiment, the identification of the node may include an internet protocol (IP) address and its fully qualified domain name (FQDN) of the node.

BRIEF DESCRIPTION OF THE DRAWINGS

Persons of ordinary skill in the art may appreciate that elements in the figures are illustrated for simplicity and clarity so not all connections and options have been shown. For example, common but well-understood elements that are useful or necessary in a commercially feasible embodiment may often not be depicted in order to facilitate a less obstructed view of these various embodiments of the present disclosure. It may be further appreciated that certain actions and/or steps may be described or depicted in a particular order of occurrence while those skilled in the art may understand that such specificity with respect to sequence is not actually required. It may also be understood that the terms and expressions used herein may be defined with respect to their corresponding respective areas of inquiry and study except where specific meanings have otherwise been set forth herein.

DETAILED DESCRIPTION

Embodiments may now be described more fully with reference to the accompanying drawings, which form a part hereof, and which show, by way of illustration, specific exemplary embodiments which may be practiced. These illustrations and exemplary embodiments may be presented with the understanding that the present disclosure is an exemplification of the principles of one or more embodiments and may not be intended to limit any one of the embodiments illustrated. Embodiments may be embodied in many different forms and should not be construed as limited to the embodiments set forth herein; rather, these embodiments are provided so that this disclosure may be thorough and complete, and may fully convey the scope of embodiments to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

Embodiments may create a system for adding clarity to error messages. Aspects of embodiments may add more capabilities to the network error messages by having reasons to the error. In one embodiment, a reason statement is added to a header section of the error message. In another embodiment, an internet protocol (IP) address of the node may also be added. In a further embodiment, a fully qualified domain name (FQDN) may also be added. As such, aspects of embodiments enable reviewers such as network administrators to easily and quickly identify the node that causes the error in transmitting the network message.

Figure 2:
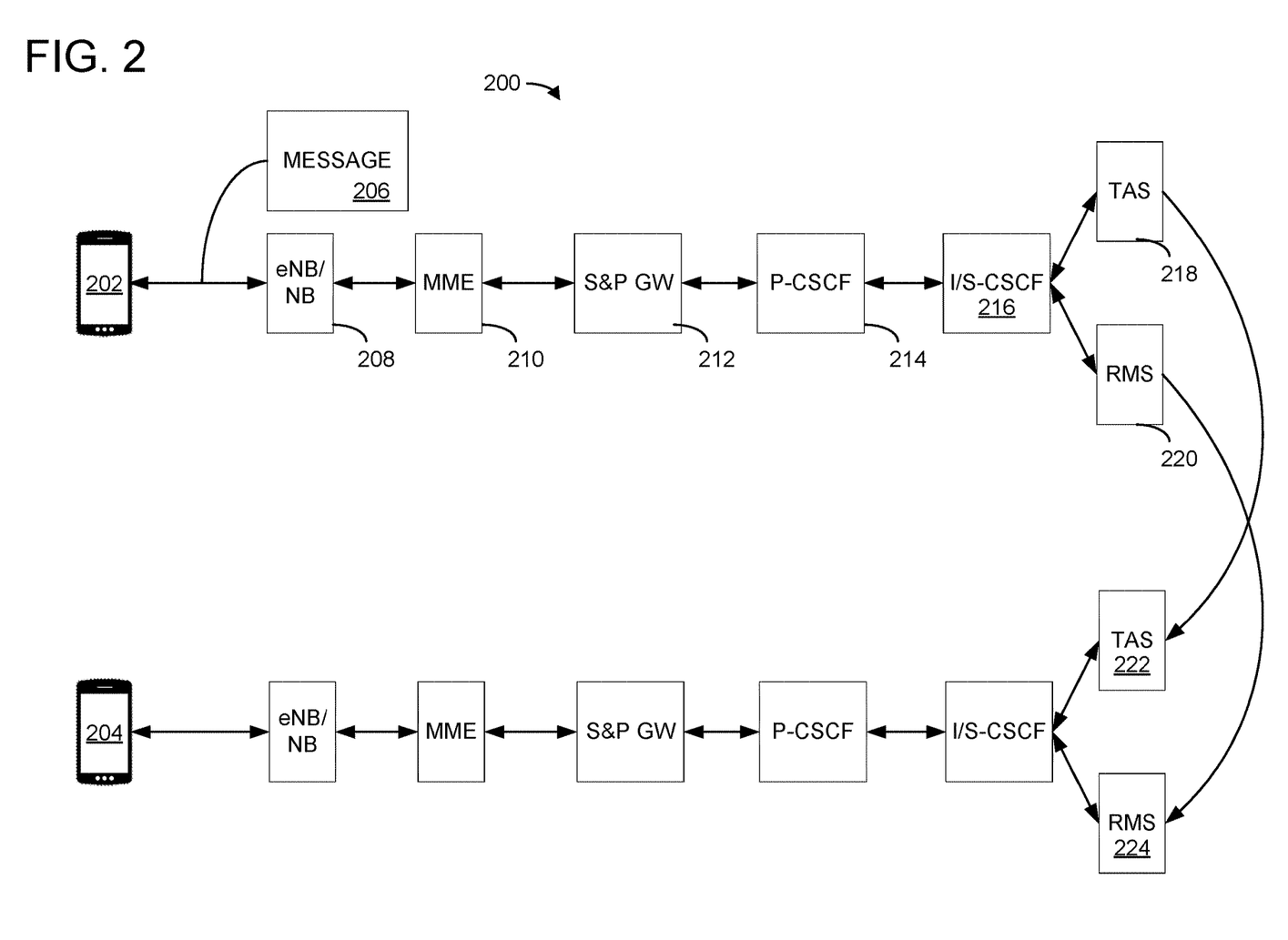
FIG. 2 is a diagram illustrating a system for creating a new error message content according to one embodiment.

Referring to FIG. 2, a system diagram 200 may illustrate one environment for creating a network message with error's reason noted according to one embodiment. In one embodiment, the system 200 may illustrate a typical chat message from an originating user equipment (UE) 202 to a terminated UE 204 in a mobile communication network, such as a Universal Mobile Telecommunications System (UMTS), a Long-Term Evolution (LTE), etc. The originating UE 202 may be mobile device, smartphone, a tablet computer, or a hotspot device. Similarly, the terminated UE 204 may be another mobile device. In a further example, the originating UE 202 may be sending a text message to the terminated UE 204. In another example, the originating UE 202 may be placing a voice or video call to the terminated UE 204.

In another embodiment, the originating UE 202 may initiate a message 206 to be sent the terminated UE 204 and that message 206 may first be sent a Node B or evolved Node B 208, which may provide a connection between mobile phones (UEs) and a wider telephone network. The message 206 may then be forwarded along to other nodes, such as a mobility management entity (MME) 210, a sending and processing gateway (S&P GW) 212, a proxy call session control function (P-CSCF) 214, an interrogating or serving call session control function (I/S-CSCF) 216, etc. In one embodiment, the one or more nodes may be combined as a cluster. In another embodiment, a voice call may be further relayed to a telephony application server (TAS) 218 while a message (text or multimedia) may be relayed to a rich messaging server (RMS) 220. Each of the TAS 218 and RMS 220 may relay the respective message to a corresponding set of TAS 222 and RMS 224 for the terminated UE 204 to receive the message 206.

In one embodiment, the P-SCSF, the Interrogating CSCF, and the serving CSCF may be considered as three logical vertical points. For example, the P-CSCF 214 may act as an entry point in an IP Multimedia Subsystem (IMS) core network. In such an example, all UE's in the IMS are attached to the P-CSCF 214. The P-CSCF 214 may be in the home domain or in the visited domain. The P-CSCF 214 may be responsible for routing incoming session initiation protocol (SIP) messages to the IMS registrar server and for facilitating policy control over the receiving (Rx) interface towards the PCRF (Policy and Charging Rules Function). The P-CSCF 214 may also be responsible for setting up IPSec Security associations with the UEs, thus ensuring secure access to the IMS core.

The I-CSCF 216, for example, may act as an inbound SIP proxy server in the IMS. During IMS registrations, the I-CSCF 216 may query a home subscriber server (HSS) to select the appropriate S-CSCF 216 which may serve the UE. During IMS sessions, the I-CSCF 216 may as the entry point to terminating session requests. The I-CSCF 216 may route the incoming session requests to the S-CSCF 216 of the called party. The role of the I-CSCF 216 in the IMS core network is minimal. However, its property of S-CSCF 216 selection may be utilized for load sharing amongst multiple S-CSCF nodes in the IMS core.

The S-CSCF 216, for example, may be another node in an IMS core network. The S-CSCF 216 may act as a registrar server, and in some cases as a redirect server. It is the central point for IMS service control over an IMS Service Control (ISC) reference point. Moreover, the S-CSCF 216 may facilitate the routing path for mobile originated or mobile terminated session requests.

As the message 206 travels through these different nodes or entities in a mobile network, if one of the nodes creates or identifies an error, contrary to prior art, the node may add a reason or a code identifying a reason of the error into a header section of the network message 206. In one embodiment, in addition to the reason, the node may further add an IP address or a fully qualified domain name (FQDN) of the node. In a further embodiment, once the node adds the header section, subsequent nodes that processes or routes the message 206 may not alter the content of the header section before routing it to the UE 202. In another embodiment, the subsequent node may maintain the header section content before routing or relaying the message to the UE 202.

Figure 3:
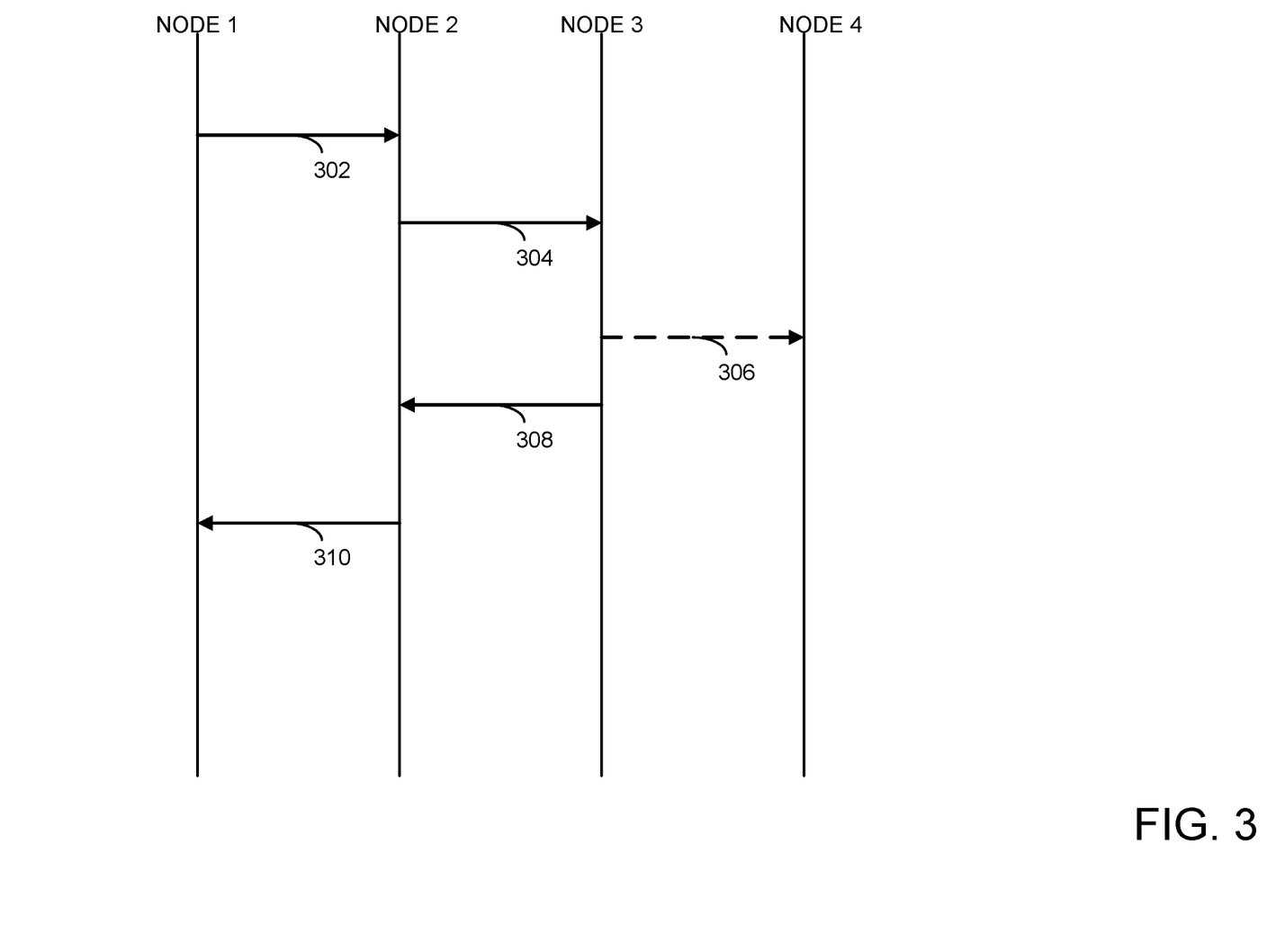
FIG. 3 is a flow diagram illustrating an example of error message header traveling through nodes in a communication network according to one embodiment.

To further illustrate aspects of embodiments, FIG. 3 is a flow diagram illustrating a message routing with the reason of an error, when error occurred, added to the message. In one embodiment, a node 1 may initiate a message at 302, such as the message 206, to be sent to a node 4. Before getting to node 4, the node 1 may need to send the message to a node 2 and a node 3 in between. At 304, the node 2 may receive the message and, after reading and processing the message, may route the message to node 3. The node 3, after receiving the message, should have routed the message to node 4 at 306. However, due to errors in the hardware or resolving a network address of the node 4, it could not route the message to the node 4. As such, an error occurred and the node 3 writes a reason to the message. In one example, the reason may be included in a header section of the message. In another embodiment, the reason may be written in other sections where optional fields may have previously assigned for such entry. In a further embodiment, the reason may further include:

Reason: Q.850; cause=200 ;text="Call completed elsewhere"

Reason: Q.850; cause=16 ;text="Terminated"

Reason: SIP; cause=600 ;text="Busy Everywhere"

Reason: SIP; cause=580 ;text="Precondition Failure"

Moreover, aspects of embodiments may add the IP address of the node 3 to the reason so as to aid diagnostic and analysis at a later time.

Furthermore, once the node 3 adds the reason to the message, node 2 and node 1 will not alter or add additional information to the header or any other portions of the header. Unlike prior approaches where the latest "reason" may be added to the header, embodiments avoid confusion with the notification of the error message and location of the error, especially when a message may travel over a large number of nodes.

As node 3 is causing the error, the message could not reach node 4. Hence, the message may be bounced back to node 1 via node 2. As mentioned above, node 2 or node 1 would not alter the error message indicated by node 3. Hence, when a network administrator reviews or a troubleshooting system reviews a copy of the message, such error message may alert the necessary individual or entities to take remedial action regarding node 3.

Aspects of embodiments overcome shortcomings of the existing approaches or implementations. For example, existing reason header, based on RFC 3326 specification, states that "Proxies generating a CANCEL request upon reception of a CANCEL from the previous hop that contains a Reason header field SHOULD copy it into the new CANCEL request." However, such header is optional and it is not mandatory. Moreover, there is no requirement of providing a location information or reference information of the node that raises the error.

Aspects of embodiments provide a new header, an error source reason header, that provides the reason of the error as well as an IP address and FQDN in the error response back from the node and the error source reason header is not altered in subsequent transmission and by subsequent nodes.

Figure 4:
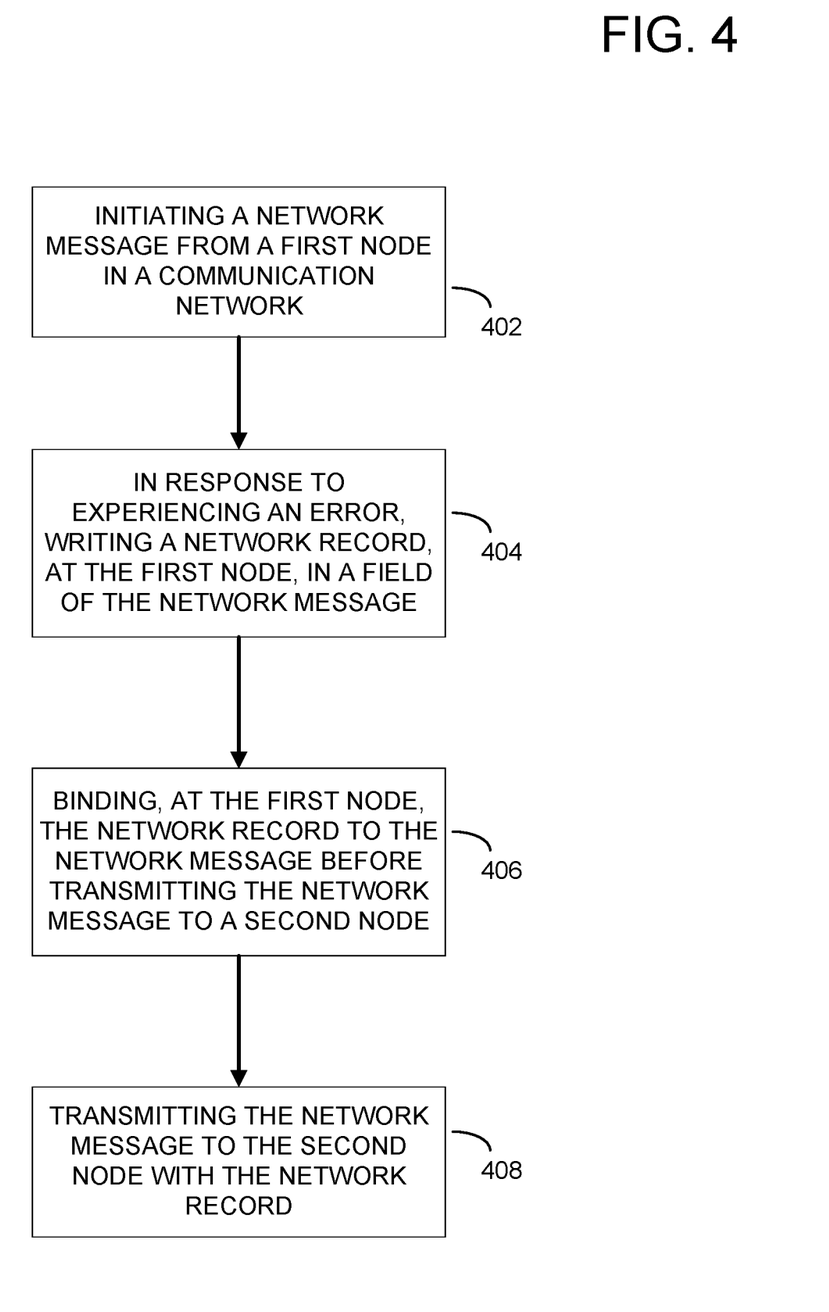
FIG. 4 is a flow chart illustrating a method according to one embodiment.

Referring now to FIG. 4, a flow chart illustrating a method according to one embodiment. At 402, a first node (e.g., node 3) may initiate a network message in a communication network to be sent to a second node (e.g., node 4). In response to experiencing an error, writing a network record, by the first node, in a field of the network message at 404. The first node may bind the network record to the network message before transmitting the network message to the second node at 406. At 408, the first node may transmit the network message to the second node with the network record at 408. In an alternative embodiment, the first node may transmit the network message to another node within the network.

Figure 5:
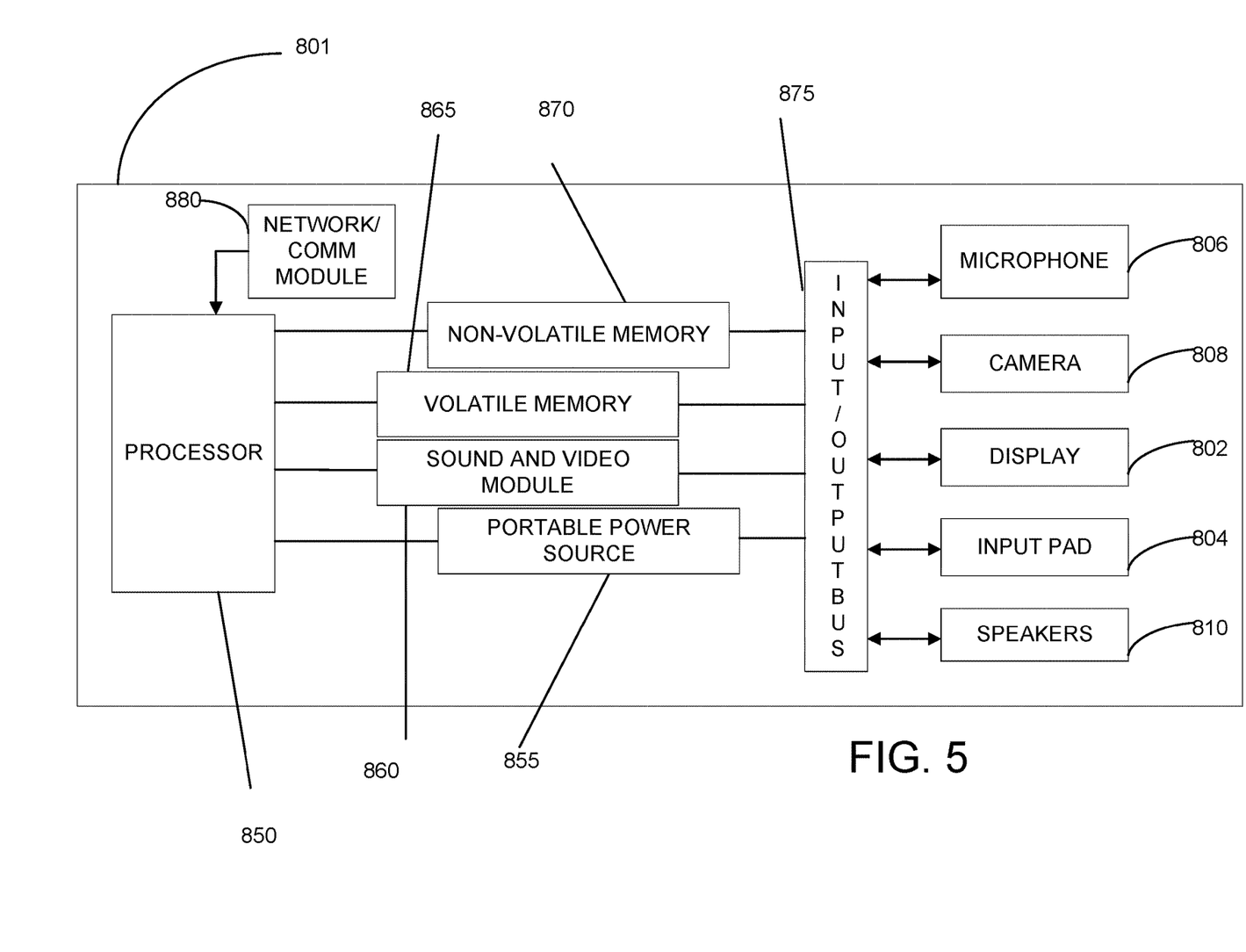
FIG. 5 is a diagram illustrating a portable computing device according to one embodiment.
Figure 6:
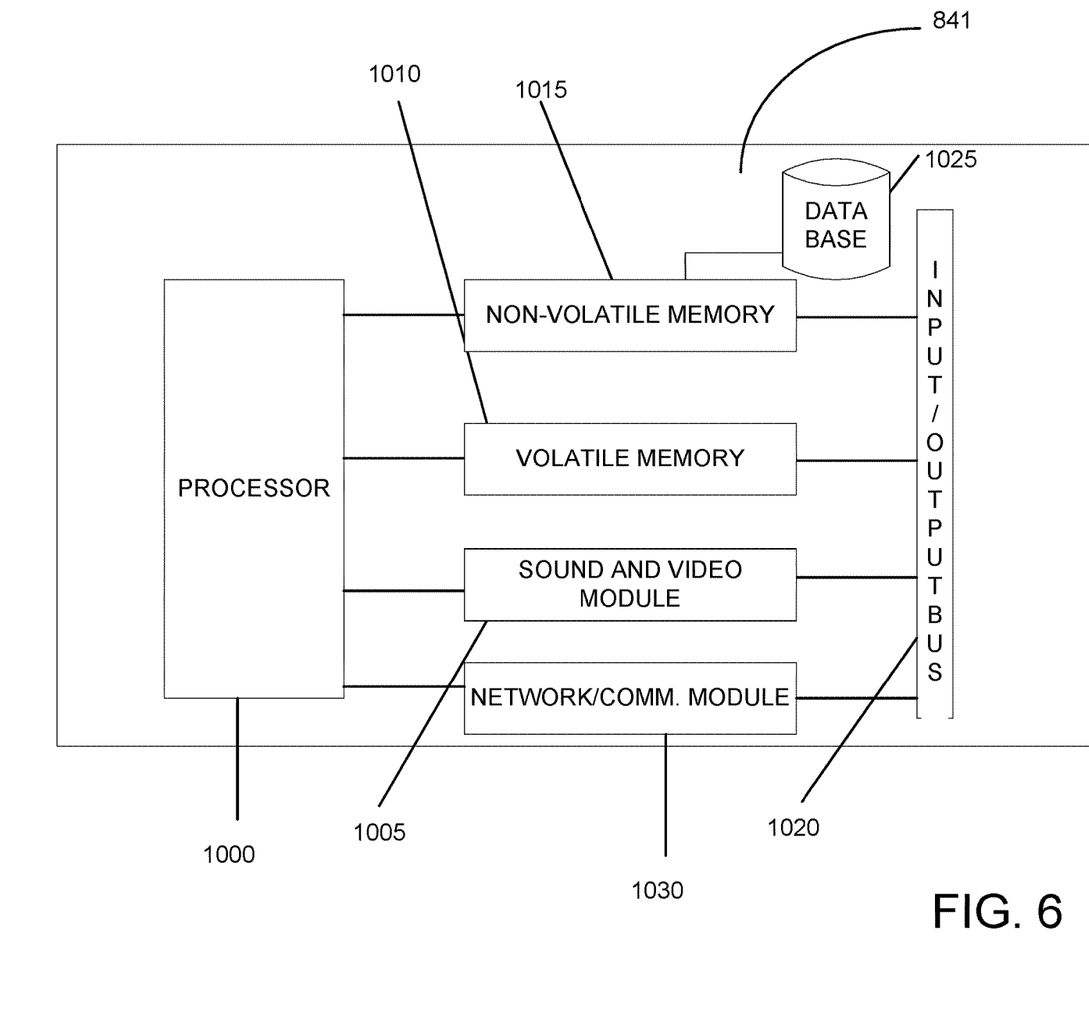
FIG. 6 is a diagram illustrating a computing device according to one embodiment.

FIG. 5 may be a high level illustration of a portable computing device 801 communicating with a remote computing device 841 in FIG. 6 but the application may be stored and accessed in a variety of ways. In addition, the application may be obtained in a variety of ways such as from an app store, from a web site, from a store Wi-Fi system, etc. There may be various versions of the application to take advantage of the benefits of different computing devices, different languages and different API platforms.

In one embodiment, a portable computing device 801 may be a mobile device 108 that operates using a portable power source 855 such as a battery. The portable computing device 801 may also have a display 802 which may or may not be a touch sensitive display. More specifically, the display 802 may have a capacitance sensor, for example, that may be used to provide input data to the portable computing device 801. In other embodiments, an input pad 804 such as arrows, scroll wheels, keyboards, etc., may be used to provide inputs to the portable computing device 801. In addition, the portable computing device 801 may have a microphone 806 which may accept and store verbal data, a camera 808 to accept images and a speaker 810 to communicate sounds.

The portable computing device 801 may be able to communicate with a computing device 841 or a plurality of computing devices 841 that make up a cloud of computing devices 811. The portable computing device 801 may be able to communicate in a variety of ways. In some embodiments, the communication may be wired such as through an Ethernet cable, a USB cable or RJ6 cable. In other embodiments, the communication may be wireless such as through Wi-Fi® (802.11 standard), BLUETOOTH, cellular communication or near field communication devices. The communication may be direct to the computing device 841 or may be through a communication network such as cellular service, through the Internet, through a private network, through BLUETOOTH, etc., via a network or communication module 880.

FIG. 5 may be a sample portable computing device 801 that is physically configured according to be part of the system. The portable computing device 801 may have a processor 850 that is physically configured according to computer executable instructions. It may have a portable power supply 855 such as a battery which may be rechargeable. It may also have a sound and video module 860 which assists in displaying video and sound and may turn off when not in use to conserve power and battery life. The portable computing device 801 may also have non-volatile memory 865 and volatile memory 870. The network or communication module 880 may have GPS, BLUETOOTH, NFC, cellular or other communication capabilities. In one embodiment, some or all of the network or communication capabilities may be separate circuits or may be part of the processor 850. There also may be an input/output bus 875 that shuttles data to and from the various user input devices such as the microphone 806, the camera 808 and other inputs, such as the input pad 804, the display 802, and the speakers 810, etc. It also may control communicating with the networks, either through wireless or wired devices. Of course, this is just one embodiment of the portable computing device 801 and the number and types of portable computing devices 801 is limited only by the imagination.

As a result of the system, better information may be provided to a user at a point of sale. The information may be user specific and may be required to be over a threshold of relevance. As a result, users may make better informed decisions. The system is more than just speeding a process but uses a computing system to achieve a better outcome.

The physical elements that make up the remote computing device 841 may be further illustrated in FIG. 6. At a high level, the computing device 841 may include a digital storage such as a magnetic disk, an optical disk, flash storage, non-volatile storage, etc. Structured data may be stored in the digital storage such as in a database. The server 841 may have a processor 1000 that is physically configured according to computer executable instructions. It may also have a sound and video module 1005 which assists in displaying video and sound and may turn off when not in use to conserve power and battery life. The server 841 may also have volatile memory 1010 and non-volatile memory 1015.

The database 1025 may be stored in the memory 1010 or 1015 or may be separate. The database 1025 may also be part of a cloud of computing device 841 and may be stored in a distributed manner across a plurality of computing devices 841. There also may be an input/output bus 1020 that shuttles data to and from the various user input devices such as the microphone 806, the camera 808, the inputs such as the input pad 804, the display 802, and the speakers 810, etc. The input/output bus 1020 may also connect to similar devices of the microphone 806, the camera 808, the inputs such as the input pad 804, the display 802, and the speakers 810, or other peripheral devices, etc. The input/output bus 1020 also may interface with a network or communication module 1030 to control communicating with other devices or computer networks, either through wireless or wired devices. In some embodiments, the application may be on the local computing device 801 and in other embodiments, the application may be remote 841. Of course, this is just one embodiment of the server 841 and the number and types of portable computing devices 841 is limited only by the imagination.

The user devices, computers and servers described herein (e.g., 801 or 841) may be computers that may have, among other elements, a microprocessor (such as from the Intel® Corporation, AMD®, ARM®, Qualcomm®, or MediaTek®); volatile and non-volatile memory; one or more mass storage devices (e.g., a hard drive); various user input devices, such as a mouse, a keyboard, or a microphone; and a video display system. The user devices, computers and servers described herein may be running on any one of many operating systems including, but not limited to WINDOWS®, UNIX®, LINUX®, MAC® OS®, iOS®, or Android®. It is contemplated, however, that any suitable operating system may be used for the present invention. The servers may be a cluster of web servers, which may each be LINUX® based and supported by a load balancer that decides which of the cluster of web servers should process a request based upon the current request-load of the available server(s).

The user devices, computers and servers described herein may communicate via networks, including the Internet, wide area network (WAN), local area network (LAN), Wi-Fi®, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of embodiments may become apparent to those skilled in the art upon review of the disclosure. The scope embodiments should, therefore, be determined not with reference to the above description, but instead should be determined with reference to the pending claims along with their full scope or equivalents.

One or more features from any embodiment may be combined with one or more features of any other embodiment without departing from the scope embodiments. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it may be understood by those of ordinary skill in the art having the present specification, figures and claims before them, that the corresponding structure includes a computer, processor, or microprocessor (as the case may be) programmed to perform the particularly recited function using functionality found in a computer after special programming and/or by implementing one or more algorithms to achieve the recited functionality as recited in the claims or steps described above. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one embodiments to the embodiments illustrated.

The present disclosure provides a solution to the long-felt need described above. In particular, the systems and methods overcome challenges of identifying, diagnosing, and troubleshooting network error message sending from one nodes to another. When analyzing and reviewing the error messages, the additional reason field or header enables network administrators to identify and troubleshoot the errors more efficiently. The new header field or content may include a reason of the error and an initiator's identification, such as the IP address or FQDN information.

Further advantages and modifications of the above described system and method may readily occur to those skilled in the art.

The disclosure, in its broader aspects, is therefore not limited to the specific details, representative system and methods, and illustrative examples shown and described above. Various modifications and variations may be made to the above specification without departing from the scope or spirit of the present disclosure, and it is intended that the present disclosure covers all such modifications and variations provided they come within the scope of the following claims and their equivalents.

What is claimed is:

1. A system comprising:
   a first node in a communication network;
   a second node in the communication network, the first node is different from the second node;
   wherein the first node is configured to process a network message before sending the network message to the second node;
   wherein the first node encounters an error when processing the network message;
   wherein the first node, in response to the encountered error and before sending the network message to the second node, writes an identifier of the first node and a reason of the error in a header section of the network message, wherein the reason comprises a descriptive text-based message; and
   wherein the first node is configured to send the network message to the second node with the header section.

2. The system of claim 1, wherein the identifier comprises an internet protocol (IP) address of the first node.

3. The system of claim 1, wherein the identifier comprises a fully qualified domain name of the first node.

4. The system of claim 1, wherein header section comprises one or more fields in the network message.

5. The system of claim 1, wherein the first node is further configured to route the network message with the header section to another node other than the second node.

6. The system of claim 1, wherein the second node is configured to maintain the header section after receiving the network message and before forwarding the network message to other nodes.

7. A computer-implemented method comprising:
   initiating a network message from a first node in a communication network;
   in response to experiencing an error and before transmitting the network message to a second node, writing, by the first node, an identifier of the first node as part of a network record, at the first node, in a field of the network message, wherein the network record comprises a descriptive text-based message;

binding, at the first node, the network record to the network message before transmitting the network message to the second node; and transmitting the network message to the second node with the network record.

8. The computer-implemented method of claim 7, wherein the network record comprises a reason for the error.

9. The computer-implemented method of claim 7, wherein the identifier of the network record comprises an internet protocol (IP) address of the first node.

10. The computer-implemented method of claim 7, wherein the network record comprises a fully qualified domain name of the first node.

11. The computer-implemented method of claim 7, wherein the field comprises a header section of the network message.

12. The computer-implemented method of claim 7, further comprising maintaining the field after receiving the network message and before forwarding the network message to other nodes.

13. A tangible non-transitory computer-readable medium having stored thereon computer-executable instructions comprising:

initiating a network message from a first node in a communication network;

in response to experiencing an error, and before transmitting the network message to a second node, writing, by the first node, an identifier of the first node as part of a network record, at the first node, in a field of the network message, wherein the network record comprises a descriptive text-based message;

binding, at the first node, the network record to the network message before transmitting the network message to the second node; and transmitting the network message to the second node with the network record.

14. The tangible non-transitory computer-readable medium of claim 13, wherein the network record comprises a reason for the error.

15. The tangible non-transitory computer-readable medium of claim 13, wherein the identifier of the network record comprises an internet protocol (IP) address of the first node.

16. The tangible non-transitory computer-readable medium of claim 13, wherein the network record comprises a fully qualified domain name of the first node.

17. The tangible non-transitory computer-readable medium of claim 13, wherein the field comprises a header section of the network message.

18. The tangible non-transitory computer-readable medium of claim 13, further comprising maintaining the field after receiving the network message and before forwarding the network message to other nodes.

19. The tangible non-transitory computer-readable medium of claim 13, further comprising transmitting the network message to another node other than the second node with the network record.

* * * * *